Patented Oct. 12, 1937

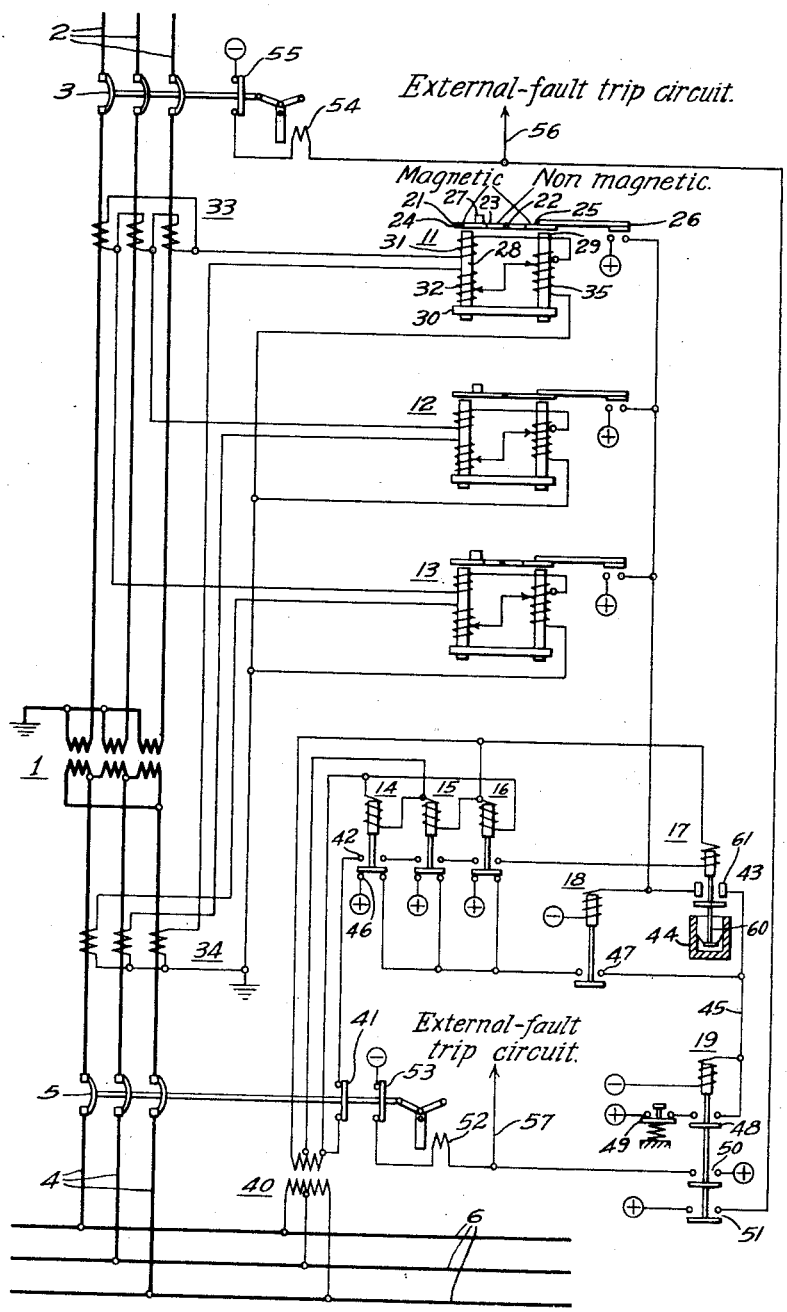

2,095,754

UNITED STATES PATENT OFFICE 2,095,754

HIGH-SPEED RATIO-DIFFERENTIAL RELAY

Lester B. Le Vesconte, Chatham, and Shirley L. Goldsborough, East Orange, N. J., assignors to Westinghouse Electric & Manufacturing Company, East Pittsburgh, Pa., a corporation of Pennsylvania Application May 2, 1936, Serial No. 77,506

16 Claims. (Cl. 175—294)

Our invention relates to a high-speed, current-ratio, differential relay, which may be a single relay-element, or an aggroupment of elements, for protecting electrical apparatus or equipment against the occurrence of an internal fault within said apparatus or equipment.

Our invention is particularly related to the protection of generators and transformers, in which case the high speed of operation of the protective equipment considerably reduces the damage which might occur to the protected apparatus by reducing the time during which the fault-current flows. The utilization of high-speed differential protective equipment is necessitated, also, by the modern use of high-speed relay equipment for protecting against external faults, that is, faults out on the line or buses to which the differentially-protected generator or transformer is connected. If the speed of operation of the differential protection is not sufficiently quick, it then becomes necessary to slow down the speed of operation of the protection against external faults, thereby frequently considerably decreasing the stability limits of the electrical system. Thus, if high-speed fault-clearing equipment is utilized on a transmission line, such equipment including, for example, high-speed distance relays and high-speed circuit breakers, an internal fault occurring in a power transformer or generator which is connected at one end of the line would cause the fault-responsive relay at the other end of the line to function on the time element, in relays as commonly constructed, as set forth, for example, in Patent No. 1,934,662, granted November 7, 1933, to S. L. Goldsborough. Unless the faulty transformer or generator can be disconnected in approximately the same time as a line-fault in the instantaneous zone of the line-relays, the time-setting of the line-relays must be materially increased, because, of course, the line-relay at the far end of the transmission line should not be permitted to trip because of the occurrence of the internal fault in the generator or transformer at the near end of the line. High-speed differential protection for transformers and generators must therefore go hand in hand with high-speed protection for transmission lines.

In order that the high-speed differential protective relay shall be satisfactorily operative, it must not only be quick and sensitive in its discriminative response to internal fault-conditions within the protected apparatus, but, for most applications, it must also impose a minimum burden upon the current-transformers from which it is energized, and in the case of equipment for the protection of power-transformers against internal faults, it is necessary that the protective equipment shall be prevented from faulty operation on magnetizing-current in-rush.

It is an object of our invention to provide a differential relay-element having only a small amount of magnetic coupling between the input and output currents of the protected apparatus, thereby making it possible to build a differential protective relay requiring a minimum current-burden on the current-transformers from which it is energized.

As pointed out in Patent No. 1,959,053, granted May 15, 1934 to S. L. Goldsborough, the high-speed differential protection of a power-transformer presents quite a problem because of the magnetizing-current in-rush which produces a transient, depending, in severity, upon the point in the voltage-wave at which the switch is closed so as to suddenly apply voltage to the transformer. This magnetizing transient causes an inequality between the input and output currents of the protected transformer, said inequality persisting for a large number of cycles, so that, for a period of anywhere from about ½ of a second to about 5 seconds, as an outside figure, it is possible for a sensitive differential-current protective element to remain energized, because of the magnetizing-current in-rush, after the initial energization of the power-transformer which is being protected.

Our present invention utilizes a device for overriding the magnetizing transients, by taking advantage of the fact that the magnetizing-current in-rush causes a voltage-collapse on only one side of the zero-line, whereas an internal fault will cause the collapse of both the positive and negative half-cycles of the voltage-wave. Since voltage is present during one-half of each cycle, during the magnetizing in-rush transient we can utilize a voltage relay which will pick up during the magnetizing transient but not during the existence of an internal fault within the protected transformer. In our present invention we have discovered that it is possible for a voltage-operated relay-element to open a set of back contacts before the trip-circuit is completed by the differential relay-element when the protected transformer-bank is first energized.

It is a further object of our invention, therefore, to provide an aggroupment of elements constituting a differential protective relay for a power-transformer, including a novel magnetizing-current tripping-suppressor, whereby correct operation may be obtained under different operating conditions, as when (1) a healthy transformer is first energized, or when (2) a faulty transformer is energized, or when (3) a recovery surge is produced, by which term we refer to the condition which would occur in the event of a fault on the transmission line close to the protected transformer, which pulls down the voltage on the transformer, but when the line-relay and the line-breaker disconnect the line from the transformer, or any phase thereof, the transformer-voltage is suddenly restored to normal, resulting in what we call a recovery surge. In all of these cases our differential relay performs correctly, without desensitizing the relay or reducing its high speed of performance in the event of an internal fault occurring in the power-transformer during its normal use with a voltage applied to it.

With the foregoing and other objects in view, our invention consists in the structure, apparatus, systems, combinations and methods hereinafter described and claimed, and illustrated in the accompanying drawing, the single figure of which is a diagrammatic view of circuits and apparatus embodying our invention in an exemplary form.

In the drawing, our invention is illustrated as being applied to the differential-current protection of a three-phase power-transformer bank 1 which is connected, on one side, to a circuit or transmission line 2, through a circuit breaker 3, and which is connected, on the other side, to a circuit or line 4, through a circuit breaker 5. In the particular system illustrated in the drawing, the line 4 is connected to a bus 6, but this detail is by no means necessary, as will be readily understood.

The protected equipment shown in the drawing consists essentially of the following elements: Three quick-acting current-ratio differential relay-elements 11, 12, and 13, one for each phase; three quick-acting voltage relay-elements 14, 15, and 16, one for each phase; a timer relay-element 17; an auxiliary relay-element 18; and a seal-in contactor switch 19.

The differential elements 11, 12, and 13 are identical in construction. Each consists of a balance-beam 21, pivoted intermediately of its ends, as indicated at 22, said beam preferably having an intermediate pivoted portion 23 of substantially non-magnetic material, and two separate end-pieces 24 and 25 of magnetic material, said end-pieces being separated from each other, but rigidly joined to the intermediate non-magnetic portion 23. A movable contact element 26 is mounted at one end of the balance-beam 21, and a counter-balancing weight 27 is mounted at the other end thereof, said counter-balancing weight being sufficiently heavy to slightly overbalance the beam, so that the contacts 26 are normally open.

The balance-beam 21 is operated upon by two electro-magnets, represented by magnetic cores 28 and 29, which are bolted to a base 30 which may be of either magnetic or non-magnetic material. The core 28 operates on the restraining side of the balance-beam, that is, it assists the counter-balance 27 in holding the switch 26 in its opened or unactuated position, whereas the core 29 operates on the operating side of the balance-beam. The restraining core 28 carries two restraining coils 31 and 32 which are energized from two current-transformers 33 and 34, respectively, so as to respond to the input and output currents of the power-transformer 1 which is being protected. The operating core 29 carries a single operating coil 35 which is energized differentially by both the input current and the output current as delivered by the current transformers 33 and 34. It will be noted, for example, that the core 28, which carries the two restraining coils 31 and 32, is a substantially open-ended magnetic circuit, which results in little coupling between the coils 31 and 32.

In normal operation, for through currents entering on one side of the transformer 1 and leaving from the other side, without any internal fault, the input and output currents are in opposition in the operating coil 35, and assist each other in the two restraining coils 31 and 32; but when there is an internal fault, with fault-current entering the transformer from both sides, the differential relay will or may respond very sensitively, or as sensitively as is desirable or practical, to the currents, or to any small difference between the input and output currents, causing operation of the relay. In the case of transformer-protection, however, we usually recommend a sensitivity of about 25%, although, for generator-protection, a sensitivity of the order of 2% or 5% is feasible.

As previously intimated, we avoid false tripping of the circuit breakers 3 and 5, by reason of the operation of one or more of the differential-balance elements on the magnetizing in-rush, by means of the three voltage-relay elements 14, 15, and 16, which are energized from the voltage appearing across the power-transformer 1 to be protected. This voltage may be derived by means of a potential transformer 40, which may be connected, either at the terminals of the power-transformer so that the potential transformer is energized only when the power-transformer is energized, or, if the power-transformer is always magnetized from the bus 6, the potential transformer 40 may be energized from the bus 6, as shown. In the latter event, it is necessary to utilize an auxiliary switch 41 on the circuit breaker 5 which connects the power-transformer 1 onto the bus 6, so that when the transformer is connected to the bus, the auxiliary switch 41 will be closed, and when the transformer is disconnected from the bus, the auxiliary switch 41 will be opened. The auxiliary switch 41 is utilized so as to complete a circuit-closing operation when voltage appears on all three phases of the power-transformer 1 which is being protected, and this function is performed by equipping each of the three voltage relay-elements 14, 15, and 16 with make contacts 42 which are closed when the voltage elements are energized, the pick-up voltage of the voltage relay-elements preferably being above 80% or 90% of the normal voltage.

A circuit-making operation is completed by the closure of all four of the contacts, including the auxiliary switch 41 of the circuit breaker 5 and the three make-contacts 42 of the voltage-responsive elements 14, 15, and 16, all of said contacts being connected in series. This circuit-making operation must be completed whenever full voltage is applied to all phases of either the primary or the secondary of the power-transformer 1, and said circuit operation must be broken or reversed whenever voltage disappears or collapses on the power-transformer 1. It is obvious that this result may be accomplished by connecting the potential transformer 40 directly across the power transformer 1, that is, between the circuit breakers 3 and 5. However, if, as previously intimated, the bus 6 is always utilized for energizing the transformer, so that voltage is never applied to the transformer until the circuit breaker 5 is closed, then it is frequently more convenient to utilize a bus potential transformer 40 as illustrated, because such a potential transformer is usually available at the substation, rather than utilizing a potential transformer which is connected directly to the power transformer to be protected. In this case, it must be assumed either that the circuit breaker 3 is never closed until after the circuit breaker 5 is closed, or that there is no source of voltage on the transmission line 2, so that, when the circuit breaker 5 is opened, there will be no voltage on the line 2.

The circuit-making operation including the four contacts 41—42—42—42, in the illustrated embodiment of our invention, is utilized to cause the timer element 17 to be energized, as by being connected across one of the phases of the potential transformer 40. We prefer to utilize, for the timer element 17, an element such as is described and claimed in Patent No. 1,934,665, granted November 7, 1933, to S. L. Goldsborough, but this is merely a matter of choice or convenience, and we have attempted to indicate the timing element 17 conventionally in the attached drawing, to intimate that any kind of element for this purpose may be utilized. It is desirable that the timer element shall pick up slowly, so as to close its make-contacts 43 only after a predetermined time-delay, which may be chosen, say, between the limits of ½ second and 5 seconds, said time-delay being obtained by any means whatsoever, symbolically indicated by means of a dashpot 44. When the timing element 17 is deenergized, it is desired that it should reset, or return to its non-energized or initial position, much more quickly, which is indicated symbolically by the illustration of the dashpot 44 which operates only in one direction of the stroke.

When the timer-element contact 43 closes, it completes the energization of a tripping circuit 45 which will be subsequently described, said energization including the three differential-element contacts 26 connected in parallel to each other and in series with the timer-contact 43. The timer element 17 is set so that its contact 43 will not close until after the differential elements 11, 12 and 13 have had time to reset after the subsidence of the magnetizing-current in-rush in the power transformer 1, so that a false tripping-operation is not obtained during this period of magnetizing-current in-rush. Thereafter, however, the timer contact 43 remains closed, so that, if any one of the three differential elements 11, 12 or 13 should pick up, a circuit will immediately be connected from the positive terminal (+) to the tripping circuit 45.

It is a unique feature of our invention that we provide for a moderately quick energization of the tripping circuit 45, without waiting for the closure of the timer contact 43, and without loss in sensitivity, in the event of the energization of a power-transformer 1 which has an internal fault therein, or in the event that an internal fault shall develop in the power-transformer immediately after its energization, and before the timer contact 43 has closed. To this end, we provide each of the voltage-responsive relay elements 14, 15, and 16 with back contacts 46, all three of which are connected in parallel, so that, if there is an internal fault of any reasonable severity in the power-transformer 1, at least one phase of the voltage will collapse sufficiently to prevent the corresponding voltage-element 14, 15 or 16 from picking up, if the fault was present at the moment of energization of the transformer, or to cause the corresponding voltage-element to drop out and instantaneously close its back contact 46, in the event that the fault develops subsequently.

It is desirable to provide a means for energizing the tripping circuit 45 when any one of the differential elements 11, 12 or 13 is energized, so as to close its contact 26, and when, at the same time, any one of the voltage elements 14, 15 or 16 is deenergized, or fails to pick up, so that its back contact 46 is closed. When the power-transformer 1 is first energized, the energization of the power-transformer is accomplished, in the illustrated embodiment of our invention, by the closure of the circuit breaker 5, and it almost invariably happens that one phase of the power-transformer 1 becomes energized, for a certain time, varying from a very brief moment to a half-cycle, or even more, in extreme cases, before the other two phases are energized, which would mean that one of the very sensitive and quick-operating differential elements 11, 12 or 13 might start to operate, or even complete its operation, on magnetizing-current in-rush, before full voltage has been applied to all three of the voltage elements 14, 15 and 16. There are conditions under which only half-voltage might appear across one or more of the voltage elements 14, 15, and 16 during this moment when less than all of the poles of the circuit breaker 5 may be closed, before the closing movement of the circuit breaker is completed.

On account of the unsymmetrical breaker-closure just discussed, it is sometimes desirable to interpose a very brief time-delay or hesitation, to allow time for the complete energization of all three phases of the power-transformer 1, before permitting the energization of the tripping circuit 45 in response to the operation of any one of the differential elements 11, 12 or 13, and the nonoperation of any one of the voltage-elements 14, 15 or 16. This time-delay, as will be readily understood, may and should be very slight, perhaps of the order of ½ of a cycle, or 1/120th of a second on a 60-cycle system, although it must be longer when the time of unsymmetrical breaker-closure may be longer than ½ of a cycle.

The time-delay just discussed is obtained by the auxiliary relay-element 18 which has been previously mentioned. Said auxiliary relay-element 18 is connected so as to be energized whenever any one of the differential-element contacts 26 is closed. The auxiliary relay 18 is provided with make contacts 47 which are connected in series between the three parallel-connected voltage-element back-contacts 46 and the tripping circuit 45, so that the tripping circuit 45 is energized from the positive bus (+) whenever the auxiliary relay-contact 47 is closed and any one of the voltage-element contacts 46 is closed.

When the tripping circuit 45 is energized, it energizes the seal-in contactor switch 19, which instantly picks up its make-contacts 48 and seals in the circuit 45 by completing a second circuit from the positive terminal (+), through a push-button 49 (for resetting purposes), to said tripping circuit 45. The seal-in contactor switch 19 is also provided with two other pairs of make-contacts 50 and 51 which are utilized for tripping the breakers 5 and 3. The contacts 50 complete a circuit from the positive terminal (+) to the trip-coil 52 of the circuit breaker 5, and thence, through an auxiliary switch 53 on said circuit breaker, to the negative terminal (—). The contacts 51 complete a similar circuit to the trip-coil 54 of the other circuit breaker 5, and thence, through the auxiliary breaker-switch 55, to the negative terminal (—).

It will be understood that, in the event of an internal fault, that is, a fault within the power-transformer 1 or other electrical apparatus which is being differentially protected, it is desirable to segregate that apparatus by opening both of the circuit breakers 3 and 5, whereas, in the event of an external fault, that is, a fault outside of the power-transformer 1 or other protected apparatus, such as a fault out on the line 2 or on the line 4, or bus 6, it is desirable to trip only one of the circuit breakers 3 or 5, whichever one is necessary in order to segregate the faulty external circuit from the sound transformer 1. To this end, means will be provided, as is usual, for tripping either one of the circuit breakers 3 or 5 in response to these external faults, and we have indicated this circumstance by showing separate external-fault trip-circuits 56 and 57 for the two circuit breakers 3 and 5, respectively.

The operation under different conditions is as follows:

When a sound or healthy transformer 1 is energized, the magnetizing transient will usually or frequently cause one or more of the differential elements 11, 12, and 13 to operate. At the same time, the voltage which energizes the transformer 1 is supplied to the voltage relay-elements 14, 15, and 16. The closure of any one of the differential-element contacts 26 on magnetizing-current in-rush will energize the auxiliary relay-element 18 and, after a very brief additional time, will close the make-contact 47 of the latter. In the brief moment of time required for the contact 47 to become closed, there has been ample time for full voltage to be applied to each one of the voltage-elements 14, 15, and 16, and these elements are so constructed that they will break their back contacts 46 in a shorter period of time than that required for any one of the differential-elements 11, 12 or 13 to move forward far enough to close its make-contact 26. Thus, by the time that the auxiliary relay-contact 47 closes, the three voltage-element back-contacts 46 are all open, and tripping does not occur.

In the protection of a polyphase power-transformer 1, as shown, it is desirable to utilize the auxiliary relay-element 18 with its contact 47 connected in series with the three voltage-element back-contacts 46, instead of having the three differential-element make-contacts 26 connected directly in series with the three voltage-element back-contacts 46. If this were not the case, it would be necessary to set the three voltage-elements 14, 15, and 16 so as to pick up on the 50% voltage which might occur during the instant of the closure of less than all of the poles of the circuit breaker which energizes the power-transformer 1. This would mean that the pick-up voltage of the voltage-elements would have to be of the order of 40% normal voltage, which would be very undesirable, as will be pointed out later.

After the completion of the closing movement of the circuit breaker 5, so as to apply voltage to the power-transformer 1, the three voltage-element make-contacts 42 and, in the illustrated embodiment, the auxiliary breaker-contacts 41, will all be closed, so as to energize the timer 17, The timer, however, will not close its contact 43 until a sufficient time after the subsidence of the magnetizing-current in-rush to permit the resetting of any of the differential-elements 11, 12 or 13, which may have operated on the magnetizing-current in-rush. After this time, which may be of the order of between ½ second and 5 seconds, a tripping circuit is connected directly from the differential-elements 11, 12, and 13, through the timer contact 43, so that, if a fault occurs thereafter, in the power-transformer 1 being protected, the instantaneous closure of the differential-relay contact 26 will instantly energize the tripping circuit 45 without any delay whatsoever.

It will be noted that, if an internal fault should occur in the power-transformer 1 while it is in operation, the fault itself will in general cause a collapse of at least one of the voltages, sufficiently to permit the dropping-out of one of the voltage relay-elements 14, 15 or 16, so that one of the voltage-element make-contacts 42 instantly opens, thereby deenergizing the timing element 17. If this timer-element 17 should drop out, opening its contact 43, before one of the differential-elements 11, 12 or 13 can move far enough to close its make-contact 26, then the energization of the trip-circuit 45 would be slightly delayed, namely long enough to permit the actuation of the auxiliary relay 18 and the complete dropping-out of one of the voltage-elements 14, 15 or 16, so as to close the back-contact 46 of the voltage-element which is deenergized by reason of the presence of the internal fault in the power-transformer 1. This time-delay, though very slight, is undesirable and unnecessary, as it is easy to construct the timer-element 17 so that its make-contact 43 will not instantly open, upon deenergization of the timer, but will take longer to open than the longest time required for one of the differential elements to close its contact 26.

The simplest way to provide for this not-too-rapid opening of the timer-contact 43 is to provide for some lost motion, so that the timer-element plunger 60 will have to move a little ways before breaking the contacts at 43. This may be accomplished by providing for a certain resilience of the contacts, which permits the timer-plunger to keep on moving, in the closing direction, after the contacts 43 have closed, so that, when the timer is deenergized, there will be a slight delay of, say, three cycles, or other suitable time necessary to make sure that the differential element 11, 12 or 13 has had ample time to close its contact 26 under the most adverse conditions, before the timer-contact 43 finally opens. This construction of a timer-element, providing for a certain amount of lost motion between the stationary and movable elements of the make-contacts 43, is indicated symbolically in the drawing by means of stationary contacts 61 which are exended longitudinally in the direction of travel of the plunger 60 of the timer-element 17.

In case the power-transformer 1 is faulty at the moment of its energization, that is, in case the power-transformer has an internal fault which is already there before the application of voltage to the transformer, current will flow into the fault, causing one or more of the differential contacts 26 to close. However, unless the fault is very trifling, in which case the delay interposed by the timing element will not be at all serious, the voltage will be too low, because of the fault, to pick up one or more of the voltage switches 14, 15 or 16. Tripping therefore occurs through the auxiliary-relay contact 47 and one or more of the back contacts 46 of the voltage-elements 14, 15, 16.

Referring to the previous mention of the function of the auxiliary switch 18, it will be noted that if this switch were omitted, in the protection of a three-phase transformer 1, it would be necessary for the pickup voltage of the voltage relay-elements 14, 15, and 16 to be about 40% of normal voltage, in order to make sure that they would pick up with reasonable promptitude on a minimum of 50% normal voltage, which is a possible condition resulting from non-simultaneous closure of the breaker poles. It is quite possible to have a moderately severe internal fault, in the power transformer 1, which would not reduce the voltage below the 40% value, in which case the voltage elements 14, 15, and 16 would all pick up on the fault condition, and it would be necessary to wait for the timer-element contact 43 to close, before tripping would occur. In extreme cases, the delay of this contact may be as much as 5 seconds.

It is obvious that the auxiliary relay 18 is very desirable, as it enables us, by the introduction of only ½ to 1 cycle time-delay effective only during the magnetizing in-rush period, to make sure that all poles of the breakers are closed in time to put full voltage upon all of the voltage relay-elements 14, 15, and 16, and it becomes possible to make the pick-up voltage of these elements around 80% or 90% of the normal voltage of the power-transformer or of the secondary windings of the potential transformer 40. Under these conditions, if any internal fault which is present in the power-transformer 1 at the moment when it is energized should not reduce the voltage to 80 or 90% of its normal voltage, it would be a very light fault, and very little disadvantage would result from waiting for the expiration of the time delay in the timing element 17 before obtaining tripping.

While it is desirable to have the quick-acting voltage-responsive relays 14, 15, and 16 pick up and drop out at a voltage only slightly below normal, so as to be sensitive to fault-conditions which do not greatly reduce the voltage of the protected power-transformer, or other protected apparatus, it is not desirable to build the voltage-responsive timer-element 17 with such a high value of pick-up and drop-out voltages, because of the much wider disparity between the pick-up and drop-out voltages of the timer, because of its much greater length of travel, its greater torque-requirements, and the general exigencies of its design. Our use of the instantaneous voltage relay-elements to control the timer thus results in the segregation of the voltage-responsive and time-keeping functions, and results in a much better coordination between the critical relay voltages and the normal voltage, as hereinabove pointed out, besides securing for the first time in the relaying-art, a separate response to the voltages in each phase of a polyphase power-transformer which is being protected against internal faults.

If a fault should occur externally of the differential connection, that is, outside of the current transformers 33 and 34, such as a fault on the line 2 close to the circuit breaker 3, the voltage on the power-transformer 1 may be considerably reduced. Meanwhile, the external-fault tripping-circuit 56 will be promptly energized to clear the external fault on the line 2, resulting in the opening of the circuit breaker 3, which will permit the transformer voltage to suddenly return to normal, assuming a source of voltage connected to the transmission line 4 on the other side of the power-transformer. This sudden restoration of voltage results in a magnetizing transient similar to the one which is obtained when the transformer is first energized, and this transient may be sufficient to operate the differential elements. We have called this transient the recovery surge. The differential protective system which we have illustrated effectively prevents faulty tripping of the differential equipment on this kind of magnetizing transient, and the action is as follows.

When the voltage is lowered by reason of the external fault, say on the line 2, one or more of the voltage-elements 14, 15 or 16 resets, thus opening the energizing circuit of the timer-element 17. After the previously mentioned period of the order of three cycles, the timer element-contact 43 opens, and the timer element becomes more or less fully reset or restored to its initial inoperative condition. This resetting of the timer element is facilitated if a timer-construction as shown in the aforesaid Patent 1,934,665 is utilized, but any suitable timer-construction may be used. It is frequently desirable, however, though not absolutely necessary for the timer to be substantially fully reset before the circuit breaker 3 can be opened by the external-fault trip-circuit 56 in response to an external fault on the line 2. After this circuit breaker 3 opens, the recovery surge occurs, but false tripping in response to the differential protective equipment is prevented in the same manner that it was prevented when the transformer was first energized, that is, by the opening of the voltage-element back-contacts 46 before the differential-element contacts 26 can cause the closure of the auxiliary-contact 47. Since all or most of the original time-delay of the timing element 17 has been inserted, the timing element will not close its contact 43 until the magnetizing transient, due to the recovery surge, has subsided and the differential elements 11, 12 and 13 have had ample time to reset.

When an external fault is being cleared, as by the opening of the circuit breaker 3, hereinabove discussed, it frequently happens that one pole of the breaker ceases arcing before the other poles, resulting in an unsymmetrical recovery voltage. However, in such a case, there is either considerable "through"-current flowing through the power-transformer into the unopened phases of the external fault, so as to strongly energize the restraining coils 31 and 32 of the differential elements, or, if the external fault is single-phase, and its phase is opened first, by the breaker 3, the voltage-element 14, 15 or 16 in that phase will quickly pick up, breaking its back-contact 46, and the other voltage-elements will be already picked up. In either case, a faulty operation of our differential protective equipment is prevented.

From the foregoing, it will be understood that we have provided a simple low-burden differential protective equipment that normally operates at high speed and high sensitivity, that fails to operate falsely on the magnetizing-current transient, and that will operate, after only a very brief hesitation (by no means comparable to the duration of the magnetizing transient) even in the event of a fault (other than the most trivial of faults) during the time required for the subsidence of the magnetizing transient.

It will be understood that, while we have illustrated our invention in a single preferred form of embodiment, utilizing various features and safeguards which are desirable at times, our invention is susceptible of embodiment in a multitude of other forms and connections, and is not limited to the utilization of all of the features and safeguards in any given installation. We desire, therefore, that the appended claims shall be accorded the broadest construction consistent with their language and the prior art.

We claim as our invention:

1. A current-ratio differential relay-element comprising at least two restraining coils, to wit, one for each of two currents to be compared, and an operating-coil means which is connected to be energized differentially from both currents, and contact-members actuated by the relay-element so as to be moved to one position when the relay-element is operated and to be moved to the other position when the operation of the relay-element is restrained, said relay-element being characterized by having means for providing one magnetic circuit for the operating-coil means and another magnetic circuit for the two restraining coils, the two magnetic circuits being separate from each other, and the magnetic circuit for the two restraining coils being so arranged that there is little coupling between the two electrical circuits in the relay, corresponding to the two currents to be compared.

2. A balance-beam current-ratio differential relay-element comprising at least two restraining coils, to wit, one for each of two currents to be compared, and an operating-coil means which is connected to be energized differentially from both currents, and contact-members actuated by the relay-element so as to be moved to one position when the relay-element is operated and to be moved to the other position when the operation of the relay-element is restrained, said relay-element being characterized by having a balance-beam pivoted intermediately of its ends, said beam having an intermediate pivoted portion of substantially non-magnetic material, and two separate end-pieces of magnetic material for cooperating, respectively, with the operating and restraining coils so as to provide one magnetic circuit for the operating-coil means and another magnetic circuit for the two restraining coils, the two magnetic circuits being separate and so arranged that there is little coupling between the two electrical circuits in the relay, corresponding to the two currents to be compared.

3. Differential protective means for a transformer comprising the combination, with switching means for the transformer, of a differentially responsive relay-element having make contacts, said differentially responsive element being responsive to the currents entering and leaving the transformer, a voltage-responsive relay-element having make contacts which are actuated to closed position when voltage is first applied to the transformer, a timer relay-element having make contacts, means for controlling the energization of the timer relay-element by the make contacts of the voltage-responsive relay-element, and means for controlling the opening operation of the switching means by the simultaneous closure of the make contacts of both the differentially responsive element and the timer element.

4. Differential protective means for a transformer comprising the combination, with switching means for the transformer, of a differentially responsive relay-element having make contacts, said differentially responsive element being responsive to the currents entering and leaving the transformer, a voltage-responsive relay-element having make contacts and back contacts which are actuated to closed position and to open position, respectively, when voltage is first applied to the transformer, a timer relay-element having make contacts, means for controlling the energization of the timer relay-element by the make contacts of the voltage-responsive relay-element, means for controlling the opening operation of the switching means by the simultaneous closure of the make contacts of the differentially responsive element and the back contacts of the voltage-responsive element, and means for controlling the opening operation of the switching means by the simultaneous closure of the make contacts of both the differentially responsive element and the timer element.

5. Differential protective means for a polyphase transformer comprising the combination, with polyphase switching means for the transformer, of a plurality of differentially responsive relay-elements each having make contacts, said differentially responsive elements being responsive to a plurality of phases, respectively, of the currents entering and leaving the transformer, a plurality of voltage-responsive relay-elements responsive to a plurality of phases, respectively, of the voltage, said voltage-responsive relay-elements having a plurality of make contacts all of which are closed when voltage is applied to all of the phases of the transformer and a plurality of back contacts each of which is opened when voltage is first applied in its phase, a timer relay-element having make contacts, means for controlling the energization of the timer relay-element by the simultaneous closure of all of the voltage-responsive make contacts, means for controlling the opening operation of the switching means by the simultaneous closure of any one of the make contacts of the differentially responsive elements and any one of the back contacts of the voltage-responsive elements, and means for controlling the opening operation of the switching means by the simultaneous closure of the make contacts of the timer element and any one of the make contacts of the differentially responsive elements.

6. Differential protective means for a transformer comprising the combination, with switching means for the transformer, of a differentially responsive relay-element having make contacts, said differentially responsive element being responsive to the currents entering and leaving the transformer, time-delay means having make contacts, means for so actuating said time-delay means that its make contacts are actuated to closed position after a time-delay after voltage is first applied to the transformer, said time-delay being greater than the time required for the differentially responsive element to reset upon the subsidence of the magnetizing-current in-rush in the transformer, a quick-acting voltage-responsive relay-element having back contacts which open more quickly, upon the application of a predetermined voltage to the transformer, than the time required for the differentially responsive element to close its make contacts in the event of an internal fault in the transformer, means for controlling the opening operation of the switching means by the simultaneous closure of the make contacts of the differentially responsive element and the back contacts of the voltage-responsive element, and means for controlling the opening operation of the switching means by the simultaneous closure of the make contacts of both the differentially responsive element and the time-delay means.

7. Differential protective means for a transformer comprising the combination, with switching means for the transformer, of a differentially responsive relay-element having make contacts, said differentially responsive element being responsive to the currents entering and leaving the transformer, time-delay means having make contacts, means for so actuating said time-delay means that its make contacts are actuated to closed position after a time-delay after voltage is first applied to the transformer, said time-delay being greater than the time required for the differentially responsive element to reset upon the subsidence of the magnetizing-current in-rush in the transformer, said time-delay means being so constructed that its make contacts, once they are closed in response to the application of voltage to the transformer, will reopen, after a time-interval, after a predetermined diminution of voltage on the transformer, said time-interval being longer than the time required for the differentially responsive element to close its make contacts in the event of an internal fault in the transformer, a quick-acting voltage-responsive relay-element having back contacts which open more quickly, upon the application of a predetermined voltage to the transformer, than the time required for the differentially responsive element to close its make contacts in the event of an internal fault in the transformer, means for controlling the opening operation of the switching means by the simultaneous closure of the make contacts of the differentially responsive element and the back contacts of the voltage-responsive element, and means for controlling the opening operation of the switching means by the simultaneous closure of the make contacts of both the differentially responsive element and the time-delay means.

8. Differential protective means for a polyphase transformer comprising the combination, with polyphase switching means for the transformer, of a differentially responsive means having make contacts for closing a circuit between two points in an electric circuit in the event of a predetermined current-unbalance condition between the input and output currents in any one of a plurality of phases of the polyphase transformer, time-delay means having make contacts, means for so actuating said time-delay means that its make contacts are actuated to closed position after a time-delay after voltage is first applied to all phases of the transformer, said time-delay being greater than the time required for the differentially responsive means to reset upon the subsidence of the magnetizing-current in-rush in the transformer, quick-acting voltage-responsive means having back contacts for closing a circuit between two points in an electric circuit upon a predetermined diminution in the voltage applied to any one of a plurality of phases of the polyphase transformer, said voltage-responsive back contacts being open during normal voltage conditions, means for controlling the opening operation of the switching means in response to a first trip-circuit including, in series circuit relation, make contacts of the differentially responsive means and back contacts of said quick-acting voltage-responsive means, said quick-acting voltage-responsive means being capable of opening said first trip-circuit, at its back contacts, in response to the application of a predetermined voltage to all phases of the polyphase transformer, more quickly than said differentially responsive means can close said first trip-circuit, at its make contacts, in response to the unbalanced current conditions which may appear during the magnetizing-current in-rush when the transformer is first energized, and means for controlling the opening operation of the switching means in response to a second trip-circuit including, in series circuit relation, make contacts of the differentially responsive means and make contacts of said time-delay means.

9. The invention as defined in claim 8, characterized by said time-delay means being so constructed and arranged that it will maintain the closure of its make contacts, in said second trip-circuit, for a longer time after a predetermined diminution of the voltage on any one of a plurality of phases of the polyphase transformer, than the time required for the differentially responsive means to close its make contacts, in said second trip-circuit, in the event of a predetermined current-unbalance condition between the input and output currents in any one of a plurality of phases of the polyphase transformer.

10. Differential protective means for a transformer comprising the combination, with switching means for the transformer, of a differentially responsive relay-element having make contacts, said differentially responsive element being responsive to the currents entering and leaving the transformer, time-delay means having make contacts, means for so actuating said time-delay means that its make contacts are actuated to closed position after a time-delay after voltage is first applied to the transformer, said time-delay being greater than the time required for the differentially responsive element to reset upon the subsidence of the magnetizing-current in-rush in the transformer, a quick-acting voltage-responsive relay-element having back contacts which open quickly upon the application of a predetermined voltage to the transformer, means, responsive to the closure of make contacts of said differentially responsive element, for effecting an auxiliary circuit-closing operation, means for controlling the opening operation of the switching means in response to both the completion of said auxiliary circuit-closing operation and the closure of back contacts of said voltage-responsive element, and means for controlling the opening operation of the switching means in response to the closures of the make contacts of both the differentially responsive element and the time-delay means.

11. Differential protective means for a polyphase transformer comprising the combination, with polyphase switching means for the transformer, of a differentially responsive means having make contacts for closing a circuit between two points in an electric circuit in the event of a predetermined current-unbalance condition between the input and output currents in any one of a plurality of phases of the polyphase transformer, time-delay means having make contacts, means for so actuating said time-delay means that its make contacts are actuated to closed position after a time-delay after voltage is first applied to all phases of the transformer, said time-delay being greater than the time required for the differentially responsive means to reset upon the subsidence of the magnetizing-current in-rush in the transformer, quick-acting voltage-responsive means having back contacts for closing a circuit between two points in an electric circuit upon a predetermined diminution in the voltage applied to any one of a plurality of phases of the polyphase transformer, said voltage-responsive back contacts being open during normal voltage conditions, means, responsive to the closure of make contacts of said differentially responsive means, for effecting an auxiliary circuit-closing operation, means for controlling the opening operation of the switching means in response to both the completion of said auxiliary circuit-closing operation and the closure of back contacts of said voltage-responsive means, said voltage-responsive means being so constructed and arranged that it will open its back contacts more quickly, after the application of a predetermined voltage to all of a plurality of phases of the polyphase transformer, than the time required for effecting said auxiliary circuit-closing operation, and means for controlling the opening operation of the switching means in response to the closure of make contacts of said differentially responsive means and make contacts of said time-delay means.

12. Differential protective means for a transformer comprising the combination, with switching means for the transformer, of quick-acting differentially responsive relay-means having contacts, said differentially responsive relay-means being responsive to the currents entering and leaving the transformer, voltage-responsive means which is actuated from one position to another at substantially the moment when voltage is first applied to the transformer, timer-means having contacts, means for controlling the energization of the timer-means by the position of the voltage-responsive means, and means for controlling the opening operation of the switching means by the simultaneous operation of the contacts of both the differentially responsive relay-means and the timer-means.

13. Differential protective means for a transformer comprising the combination, with switching means for the transformer, of quick-acting differentially responsive relay-means having contacts, said differentially responsive relay-means being responsive to the currents entering and leaving the transformer, voltage-responsive means which is actuated from one position to another at substantially the moment when voltage is first applied to the transformer, timer-means having contacts, means for controlling the energization of the timer-means by the position of the voltage-responsive means, means for controlling the opening operation of the switching means by the simultaneous operation of the contacts of the differentially responsive relay-means and the position of the voltage-responsive means, and means for controlling the opening operation of the switching means by the simultaneous operation of the contacts of both the differentially responsive relay-means and the timer-means.

14. Differential protective means for a polyphase transformer comprising the combination, with polyphase switching means for the transformer, of a plurality of differentially responsive relay-elements each having contacts, said differentially responsive elements being responsive to a plurality of phases, respectively, of the currents entering and leaving the transformer, voltage-responsive means for accomplishing a circuit-controlling function after a magnetizing in-rush time-delay after predetermined voltages have been applied to all of a plurality of phases of the transformer and for reversing said circuit-controlling function much more quickly when a predetermined voltage fails to be maintained on any one of a plurality of phases of the transformer, said magnetizing in-rush time-delay being sufficient to allow for the resetting of the differentially responsive elements after the subsidence of the magnetizing-current in-rush in the transformer, and means for controlling the opening operation of the switching means by the simultaneous actuation of any one of the differentially responsive elements and the accomplishment of said voltage-responsive magnetizing in-rush time-delay circuit-controlling function.

15. Differential protective means for a polyphase transformer comprising the combination, with polyphase switching means for the transformer, of a plurality of differentially responsive relay-elements each having contacts, said differentially responsive elements being responsive to a plurality of phases, respectively, of the currents entering and leaving the transformer, voltage-responsive means for accomplishing a first circuit-controlling function at substantially the moment when a predetermined voltage fails to be applied to any one of a plurality of phases of the transformer and for reversing said circuit-controlling function at substantially the moment when predetermined voltages are applied to all of a plurality of phases of the transformer, voltage-responsive means for accomplishing a second circuit-controlling function after a magnetizing in-rush time-delay after predetermined voltages have been applied to all of a plurality of phases of the transformer and for reversing said circuit-controlling function much more quickly when a predetermined voltage fails to be maintained on any one of a plurality of phases of the transformer, said magnetizing in-rush time-delay being sufficient to allow for the resetting of the differentially responsive elements after the subsidence of the magnetizing-current in-rush in the transformer, and means for controlling the opening operation of the switching means by the simultaneous actuation of any one of the differentially responsive elements and the accomplishment of either one of said circuit-controlling functions.

16. Differential protective means for a polyphase transformer comprising the combination, with polyphase switching means for the transformer, of a plurality of differentially responsive relay-elements each having contacts, said differentially responsive elements being responsive to a plurality of phases, respectively, of the currents entering and leaving the transformer, a plurality of voltage-responsive means responsive to a plurality of phases, respectively, of the voltage, timer-means having contacts, means for so controlling the energization of the timer-means by the simultaneous actuations of all of the voltage-responsive means that the timer-means will be energized when predetermined voltages are applied to all of the phases of the transformer and will be deenergized when a predetermined voltage fails to be applied to any phase of the transformer, means for controlling the opening operation of the switching means by the simultaneous actuation of any one of the differentially responsive elements and the non-actuation of any one of the voltage-responsive means, and means for controlling the opening operation of the switching means by the simultaneous actuation of any one of the differentially responsive elements and the actuation of the timer-means.

LESTER B. LE VESCONTE.
SHIRLEY L. GOLDSBOROUGH.